United States Patent
Hsu

(10) Patent No.: US 9,592,874 B2
(45) Date of Patent: *Mar. 14, 2017

(54) INTELLIGENT BICYCLE

(71) Applicant: Tau-Jeng Hsu, Shenzhen (CN)

(72) Inventor: Tau-Jeng Hsu, Shenzhen (CN)

(73) Assignee: MEIZHOU XIUYING ENTERPRISE COMPANY LIMITED, MeiXian (CN)

( * ) Notice: Subject to any disclaimer, the term of this patent is extended or adjusted under 35 U.S.C. 154(b) by 47 days.

This patent is subject to a terminal disclaimer.

(21) Appl. No.: 14/576,224

(22) Filed: Dec. 19, 2014

(65) Prior Publication Data

US 2015/0130944 A1    May 14, 2015

(51) Int. Cl.
| | |
|---|---|
| *B62J 99/00* | (2009.01) |
| *B62J 6/00* | (2006.01) |
| *B62J 3/00* | (2006.01) |
| *H04N 7/18* | (2006.01) |
| *B62J 6/04* | (2006.01) |

(52) U.S. Cl.
CPC .............. *B62J 99/00* (2013.01); *B62J 3/00* (2013.01); *B62J 6/005* (2013.01); *B62J 6/04* (2013.01); *B62J 6/001* (2013.01); *B62J 2099/002* (2013.01); *B62J 2099/0013* (2013.01)

(58) Field of Classification Search
CPC ........ B62J 2099/0006; B62J 2099/0026; B62J 3/00; B62J 6/001; B62J 6/04; B62J 7/02; B62J 6/02; B62J 33/00; B60Q 1/2615; B60Q 5/005; B60Q 9/00; B60R 1/00; B60R 2300/301; B60R 2300/302; B60R 2300/8066

See application file for complete search history.

(56) References Cited

U.S. PATENT DOCUMENTS

| | | | | |
|---|---|---|---|---|
| 7,714,704 | B1 * | 5/2010 | Mellen ...................... | B60R 1/00 340/425.5 |
| 2003/0159870 | A1 * | 8/2003 | Yu ............................. | B62M 6/45 180/206.2 |
| 2008/0119330 | A1 * | 5/2008 | Chiang ................... | A63B 24/00 482/8 |
| 2010/0171832 | A1 * | 7/2010 | Solida ...................... | B62J 99/00 348/148 |

\* cited by examiner

*Primary Examiner* — Sisay Yacob
(74) *Attorney, Agent, or Firm* — Rabin & Berdo, P.C.

(57) ABSTRACT

An intelligent system for a bicycle is provided with a control assembly including a saddle control device, a sensor device, a digital camera, a lighting device, a warning device, and a power supply for supplying DC power to above components; and a display assembly including an LCD screen, a processing module, a communications module, and a power module for electrically interconnecting the LCD screen, the processing module, and the communications module. The saddle control device includes a microprocessor, a memory, and a wireless communications module. The sensor device includes an optical sensor, a thermometer, an acceleration sensor, a barometer, a gyroscope, an electronic compass, a radar, and a GPS. The digital camera includes front and rear cameras. The lighting device includes an auxiliary light, a rear light, a directional light, and a decoration light. The warning device includes a loudspeaker and a vibration module.

5 Claims, 5 Drawing Sheets

INTELLIGENT BICYCLE

BACKGROUND OF THE INVENTION

1. Field of the Invention

The invention relates to bicycles and more particularly to a bicycle including a control assembly mounted on a saddle, a display assembly mounted on the handlebars, and an auxiliary assembly mounted on the saddle and the handlebars.

2. Description of Related Art

Bicycles are a convenient, low-cost and environmental friendly form of transport. To enhance strength, comfort and functionality of bicycles, many auxiliary devices have been proposed. For example, there is a device incorporating rear-view mirror(s), a camera, and a display mounted on a bicycle. While it is simple, it is not practical.

The danger of riding a bicycle is about the same as driving a car or a motorcycle. It is suggested that front and rear lights should be installed on a bicycle. But it is often that a rider forgets to turn on the lights in the night. Further, there is a need of installing a stand on the handlebars or some part of a bicycle for anchoring a mobile phone or a music playing device so that a rider may listen to music while driving.

In light of above, the need for improvement of a bicycle still exists.

SUMMARY OF THE INVENTION

It is therefore one object of the invention to provide an intelligent system for a bicycle including a saddle, a frame, two wheels, and handlebars, comprising a control assembly mounted on the saddle and including a saddle control device, a sensor device, a digital camera, a lighting device, a warning device, and a power supply for supplying direct current (DC) power to the saddle control device, the sensor device, the digital camera, the lighting device, and the warning device for electrical interconnection; and a display assembly mounted on the handlebars and including a liquid crystal display (LCD) screen, a processing module, a communications module, and a power module for electrically interconnecting the LCD screen, the processing module, and the communications module; wherein the saddle control device includes a microprocessor, a memory, and a wireless communications module electrically interconnected; the sensor device includes an optical sensor, a thermometer, an acceleration sensor, a barometer, a gyroscope, an electronic compass, a radar, and a global positioning system (GPS); the digital camera includes a front camera and a rear camera; the lighting device includes an auxiliary light, a rear light, a directional light, and a decoration light; and the warning device includes a loudspeaker and a vibration module.

The above and other objects, features and advantages of the invention will become apparent from the following detailed description taken with the accompanying drawings.

DETAILED DESCRIPTION OF THE INVENTION

Figure 1:
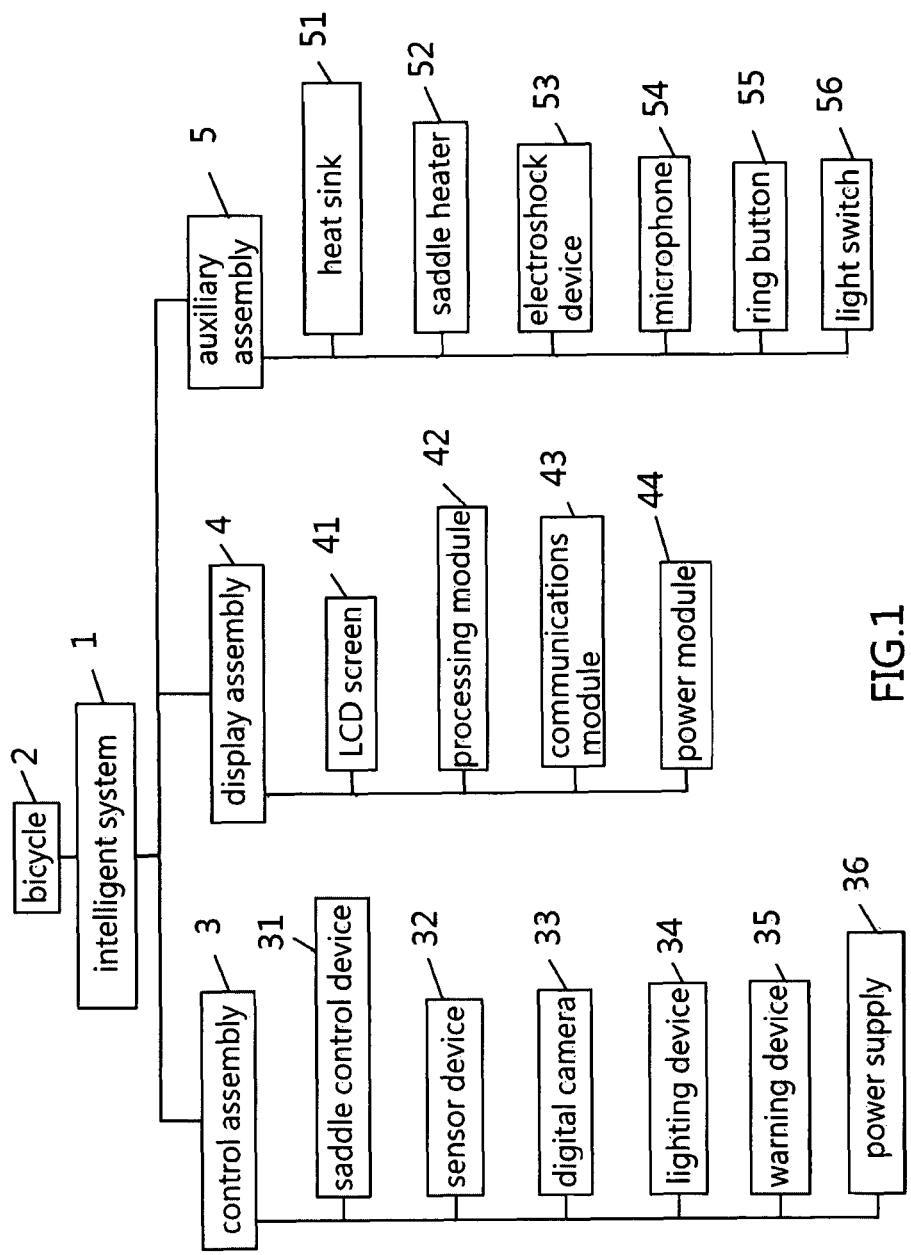
FIG. 1 is a block diagram of an intelligent system for a bicycle according to the invention.
Figure 2A:
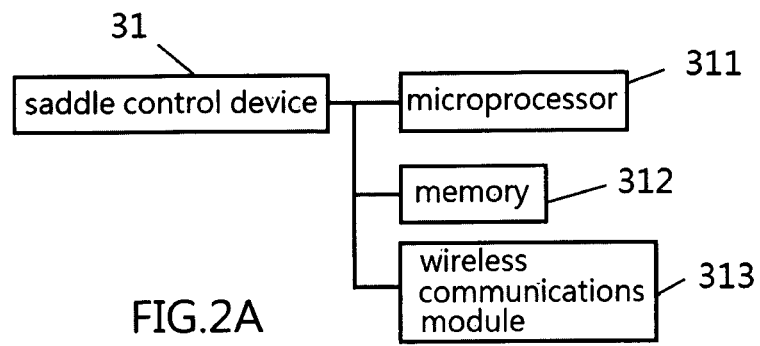
FIG. 2A is a block diagram of the saddle control device.
Figure 2B:
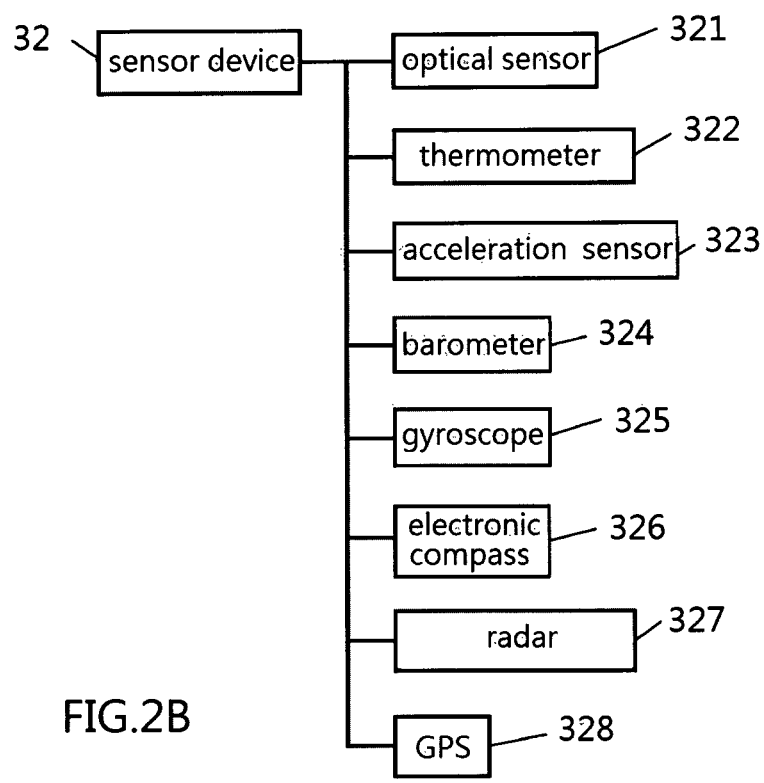
FIG. 2B is a block diagram of the sensor device.
Figure 2C:
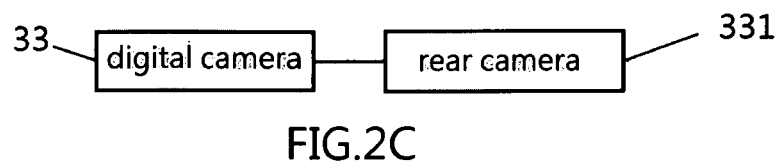
FIG. 2C is a block diagram of the digital camera.
Figure 2D:
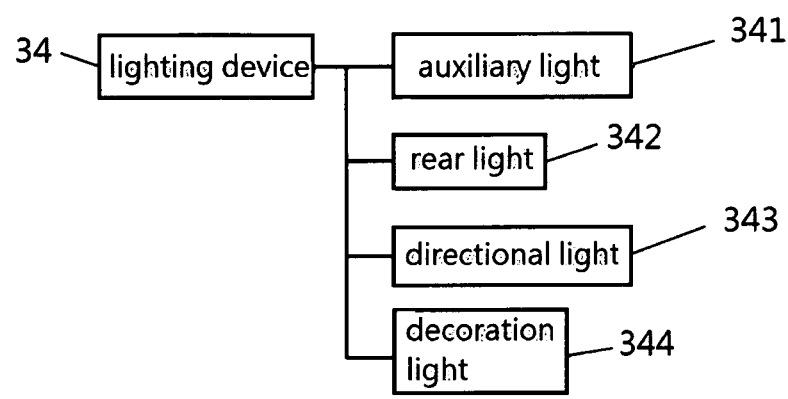
FIG. 2D is a block diagram of the lighting device.
Figure 2E:
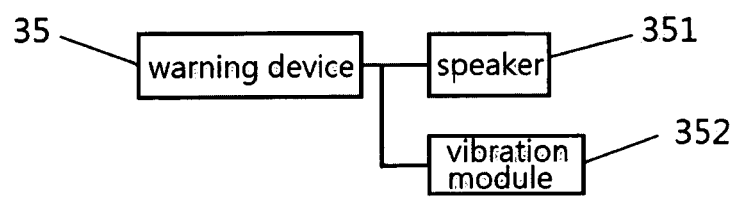
FIG. 2E is a block diagram of the warning device.
Figure 3:
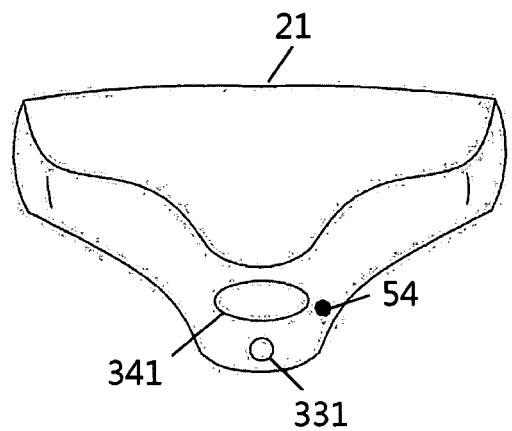
FIG. 3 is a front view of a bicycle saddle incorporating a portion of the intelligent system.
Figure 4:
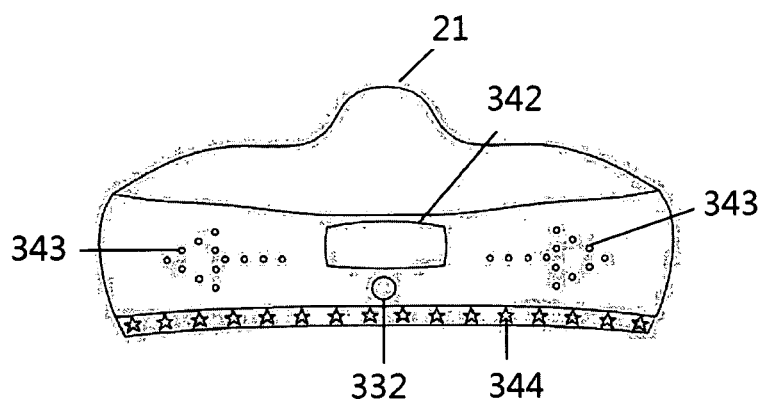
FIG. 4 is a rear view of the bicycle saddle of FIG. 3.
Figure 5:
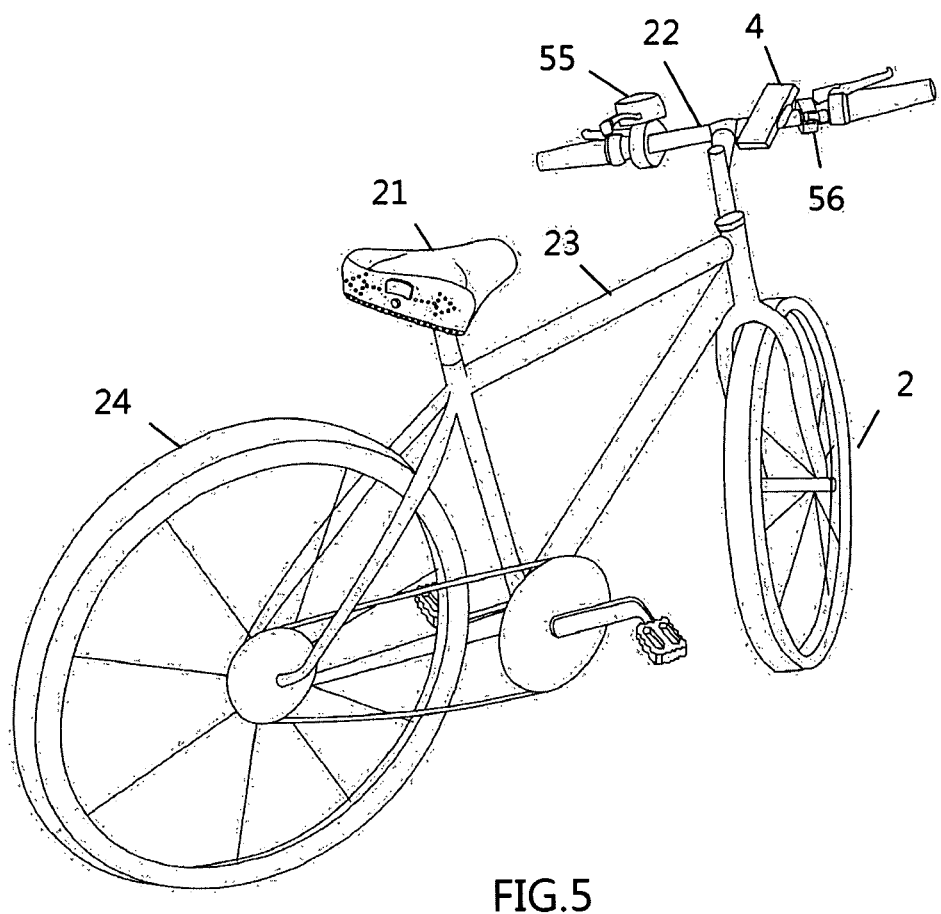
FIG. 5 is a perspective view of a bicycle mounted with the intelligent system.

Referring to FIGS. 1 to 5, an intelligent system 1 for a bicycle 2 in accordance with the invention comprises the following components as discussed in detail below.

A control assembly 3 is mounted on a saddle 21 of the bicycle 1 and includes a saddle control device 31, a sensor device 32, a digital camera 33, a lighting device 34, a warning device 35, and a power supply 36 for supplying direct current (DC) power to all of the above components so that they can be electrically interconnected.

A display assembly 4 is mounted on handlebars 2 and includes a liquid crystal display (LCD) screen 41, a processing module 42, a communications module 43, and a power module 44 all electrically interconnected. The LCD screen 41 is a touch screen panel. Alternatively, the display assembly 4 is replaced by a smart phone or a tablet computer.

The saddle control device 31 is used to compress or decompress video files and audio files, transmit or receive data, perform numerical analysis, and perform automatic control. The saddle control device 31 includes a microprocessor 311, a memory 312, and a wireless communications module 313 all electrically interconnected. The sensor device 32 includes an optical sensor 321, a thermometer 322, an acceleration sensor 323, a barometer 324, a gyroscope 325, an electronic compass 326, a radar 327, and a global positioning system (GPS) 328. The optical sensor 321 is used to sense brightness of the environment. The thermometer 322 is used to measure temperature of the saddle 21. The acceleration sensor 323 is used to sense acceleration of the bicycle 2 when riding. The barometer 324 is used to measure atmospheric pressure of the location where the bicycle 2 is riding. The gyroscope 325 is used to measure orientation. The electronic compass 326 is used to show direction of the bicycle 2 when riding. The radar 327 is used to determine distance of a following vehicle. The GPS 328 is used to show location of the bicycle 2 when riding.

The digital camera 33 includes a front camera 331 mounted on a front end of the saddle 21 for recording images from forward, and a rear camera 332 mounted on a rear end of the saddle 21 for recording images from rearward. The lighting device 34 includes an auxiliary light 341 mounted on a front end of the saddle 21, a rear light 342 mounted on a rear end of the saddle 21, a directional light 343 mounted on a rear end of the saddle 21, and a decoration light 344 mounted on a rear end of the saddle 21. The warning device 35 includes a loudspeaker 351 and a vibration module 352. The loudspeaker 351 is used to make sounds or voice, issue an audio warning, or play music. The vibration module 352 is used to vibrate the saddle 21 for alerting purpose.

The display assembly 4 is used to show images and data sent from the saddle control device 31 or set the saddle control device 31. The wireless communications module 313 wirelessly communicates with the communications module 43 in the form of Wifi, Bluetooth, mobile phone access to the Internet, or electromagnetic wave of 2.4G wide band. The power supply 36 is rechargeable. For example, the power supply 36 is a rechargeable battery, a solar cell, a dynamo, or a combination thereof. The power supply 36 is mounted on the saddle 21 or the frame 23 if it is implemented as a solar cell. The power supply 36 is mounted on the wheel 24 if it is implemented as a dynamo.

An auxiliary assembly 5 is mounted on both the saddle 21 and the handlebars 22 and includes a heat sink 51 mounted on the saddle 21 for decreasing temperature of the saddle 21 when riding, a saddle heater 52 mounted on the saddle 21 and being in electrical connection with the saddle control device 31 and the power supply 36 so as to increase temperature of the saddle 21, an electroshock device 53 mounted on the saddle 21 and being in electrical connection with the saddle control device 31 and the power supply 36 so as to incapacitate a person by administering electric shock aimed at causing pain, a microphone 54 mounted on the saddle 21 and being in electrical connection with the saddle control device 31 and the power supply 36 so as to record voice, a ring button 55 mounted on the saddle 21 and being in wireless communication with the saddle control device 31 for activating the loudspeaker 351 or not, and a light switch 56 for activating the auxiliary light 341, the rear light 342, the directional light 343, and the decoration light 344 or not. Alternatively, both the ring button 55 and the light switch 56 are interconnected to the saddle control device 31. Alternatively, the heat sink 51 is an electric fan.

It is envisaged by the invention that additional functions GPS, road images, ride recording, antitheft, audio alarm, and music playing are provided to a bicycle when riding. Thus, a rider can enjoy the ride.

While the invention has been described in terms of preferred embodiments, those skilled in the art will recognize that the invention can be practiced with modifications within the spirit and scope of the appended claims.

What is claimed is:

1. An intelligent system for a bicycle including a saddle, a frame, two wheels, and handlebars, comprising:
    a control assembly mounted on the saddle and including
        a saddle control device,
        a sensor device,
        a digital camera,
        a lighting device,
        a warning device, and
        a power supply for supplying direct current (DC) power to the saddle control device, the sensor device, the digital camera, the lighting device, and the warning device for electrical interconnection; and
    a display assembly mounted on the handlebars and including
        a liquid crystal display (LCD) screen,
        a processing module,
        a communications module, and
        a power module for electrically interconnecting the LCD screen, the processing module, and the communications module;
    wherein the saddle control device includes
        a microprocessor,
        a memory, and
        a wireless communications module electrically interconnected;
    wherein the sensor device includes
        an optical sensor,
        a thermometer,
        an acceleration sensor,
        a barometer,
        a gyroscope,
        an electronic compass,
        a radar, and
        a global positioning system (GPS);
    wherein the digital camera includes
        a front camera and
        a rear camera;
    wherein the lighting device includes
        an auxiliary light,
        a rear light,
        a directional light, and
        a decoration light; and
    wherein the warning device includes
        a loudspeaker and
        a vibration module.

2. The intelligent system of claim 1,
    wherein the power supply is a rechargeable battery, a solar cell, a dynamo, or a combination thereof; and
    wherein the power supply is mounted on the saddle or the frame if it is implemented as the solar cell, or the power supply is mounted on one of the wheels if it is implemented as the dynamo.

3. The intelligent system of claim 1, further comprising an auxiliary assembly including
    a heat sink mounted on the saddle,
    a saddle heater mounted on the saddle and being in electrical connection with the saddle control device and the power supply,
    an electroshock device mounted on the saddle and being in electrical connection with the saddle control device and the power supply,
    a microphone mounted on the saddle and being in electrical connection with the saddle control device and the power supply,
    a ring button mounted on the saddle and being in wireless communication with the saddle control device, and
    a light switch for selectively activating the auxiliary light, the rear light, the directional light, and the decoration light.

4. The intelligent system of claim 3,
    wherein the LCD screen is a touch screen panel, and
    wherein the heat sink is an electric fan.

5. The intelligent system of claim 4, wherein the display assembly is a smart phone or a tablet computer.

* * * * *